No. 662,222. Patented Nov. 20, 1900.
H. COOK.
CLOTHES LINE REEL.
(Application filed Aug. 1, 1900.)
(No Model.)
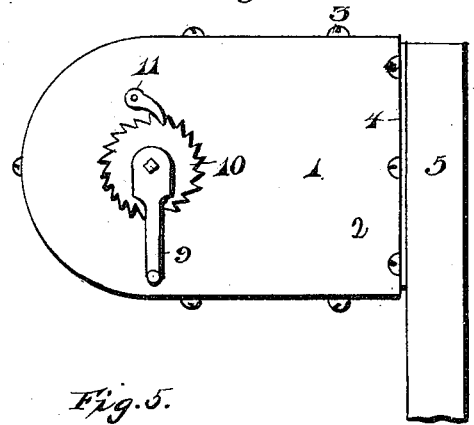
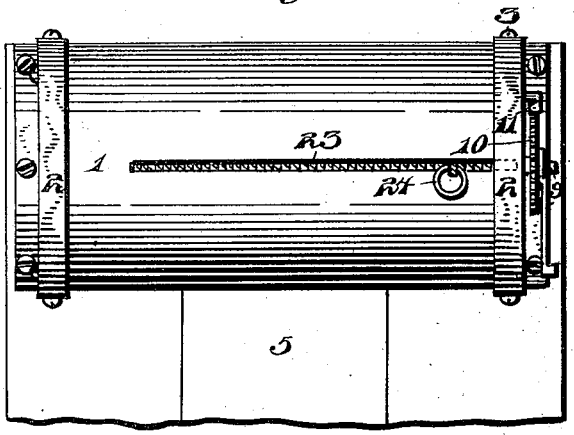
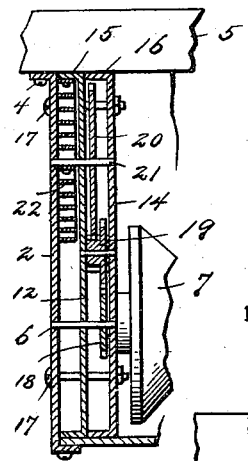
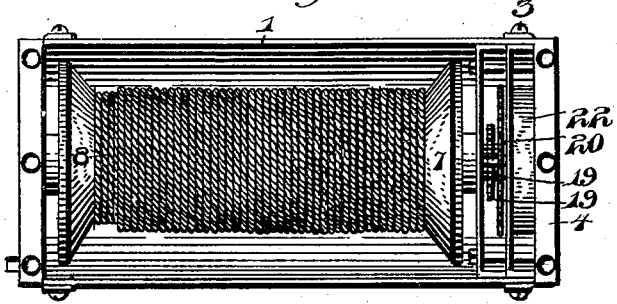
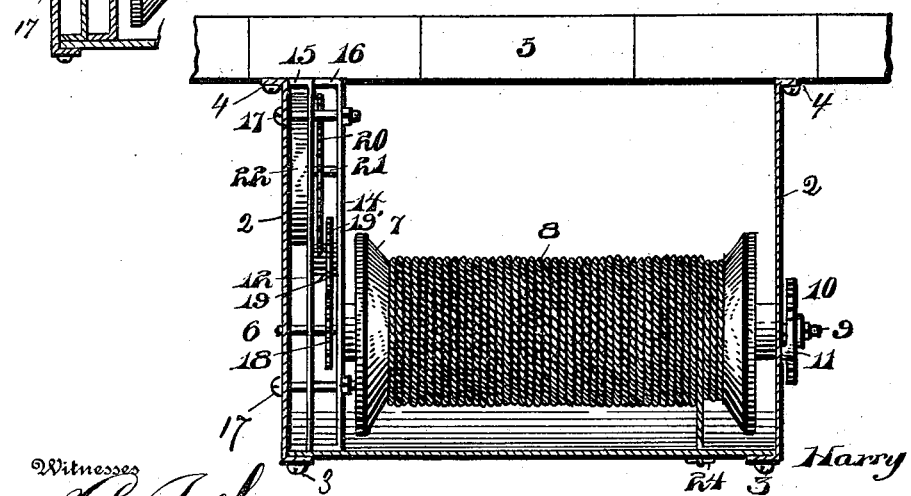
Witnesses
Inventor
Harry Cook.
Attorneys.
THE NORRIS PETERS CO., PHOTO-LITHO., WASHINGTON, D. C.

UNITED STATES PATENT OFFICE.

HARRY COOK, OF McKEESPORT, PENNSYLVANIA.

CLOTHES-LINE REEL.

SPECIFICATION forming part of Letters Patent No. 662,222, dated November 20, 1900.

Application filed August 1, 1900. Serial No. 25,530. (No model.)

*To all whom it may concern:*

Be it known that I, HARRY COOK, a citizen of the United States of America, residing at McKeesport, in the county of Allegheny and State of Pennsylvania, have invented certain new and useful Improvements in Clothes-Line Reels, of which the following is a specification, reference being had therein to the accompanying drawings.

This invention relates to certain new and useful improvements in clothes-line holders or reels, and has for its object to construct a device in which the clothes-line when not in use will be inclosed within a casing to protect the same from the weather, and the invention aims to provide novel and effective means whereby this line will be automatically wound upon a spool or reel within the casing when the outer end of the same has been unfastened; and the invention consists in the novel means for actuating the spool or reel for winding the line thereon, together with the inclosing casing and various details entering into the invention, as will be hereinafter more specifically described, and then particularly pointed out in the appended claims.

In describing the invention in detail reference is had to the accompanying drawings, forming a part of this specification, and wherein like numerals of reference indicate corresponding parts throughout the several views, in which—

Figure 1 is an end view of my improved clothes-line holder or reel, showing the same attached in position on a suitable support. Fig. 2 is a front view of the same. Fig. 3 is a rear elevation of the same. Fig. 4 is a horizontal sectional view showing the device secured in position on its support. Fig. 5 is a horizontal sectional view of a part of the reel, showing the connection of the winding-spring with its shaft and the case.

To put my invention into practice, I provide a suitable casing 1, preferably composed of a suitable metal, and which is shaped to a substantially U shape in cross-section or end view. This U-shaped casing is closed at its ends by the end plates 2 2, which are provided with flanges to overlap upon the outer face of the casing 1 at its ends, which flanges are securely riveted or bolted to the casing 1, as at 3. These end plates are also provided with flanges 4, which are apertured to receive securing means by which the device is attached to a building or other support 5, this support serving to close the rear of the casing 1. Journaled in the end plates and lying within the casing 1 is a shaft 6, which has rigidly mounted thereon within the casing a suitable spool or reel proper, 7, upon which the line 8 is adapted to be wound and to which its inner end is attached. On one of its ends this shaft 6 is constructed to receive a crank 9 and has mounted thereon between the crank and the end plate a ratchet-wheel 10, adapted to be engaged by a pawl 11, carried by the end plate. This ratchet and pawl hold the line against further unwinding when a sufficient unwinding of the same for the desired purpose has been performed, the crank enabling the operator to turn the spool so as to take up any slack in the line.

Within the opposite end of the casing is arranged a pair of plates 12 14, spaced apart by means of end flanges 15 16 on the plates and both secured to the end plate adjacent thereto by bolts 17. Mounted upon the shaft 6, between the plate 12 and the plate 14, is a pinion 18, which meshes with a pinion 19', mounted on a toothed shaft 19, journaled in the plates 12 and 14. This toothed shaft 19 meshes with and drives a larger pinion 20, mounted on a shaft 21, journaled in the plates 12 and 14 and in the end plate 2 adjacent thereto. Connected to the portion of this shaft 21 that is between the plate 12 and the end plate 2 is one end of a winding-spring 22, the other end of which is suitably connected to the flange at one end of the plate 12 or at any desired point.

The casing 1 is provided centrally of its front face with an oblong slot 23 for the cord or line 8 to operate through in winding or unwinding the same upon the spool or reel proper, this line carrying on its forward end a ring 24 or other device of like nature, which forms a catch for the operator when unwinding the line, and also acts as a stop to limit the winding of the line, so as to prevent the free end of the same being drawn into the casing.

It is thought that the operation of the device will be clearly understood from the foregoing description, taken in connection with the accompanying drawings, as it will be observed that the tension of the spring 22 will normally retain the line wound upon its spool, and upon the disengagement of the pawl 11 from the ratchet 10 the line 8 may be withdrawn from its casing, winding the spring 22 and increasing the tension as the line is unwound from the spool, so that when the free end of the line is unfastened this spring 22 will rewind the line upon its spool.

It will be noted that in the construction of such a device various changes may be made in the details of construction without departing from the general spirit of my invention.

Having thus fully described my invention, what I claim as new, and desire to secure by Letters Patent, is—

1. In a device of the character described, the combination with the substantially U-shaped casing, and the flanged end plates secured to said casing, of a shaft journaled in said end plates, a spool mounted on said shaft within the casing, a pair of flanged plates 12, 14, arranged within the casing at one end thereof and secured to one of the end plates, a pinion 18 mounted on the shaft of the spool between the plates 12, 14, a toothed shaft journaled in said plates above the pinion 18, a pinion 19' mounted on said toothed shaft and in mesh with the pinion 18, a shaft 21 journaled in one of the end plates and in said plates 12, 14, a pinion 20 mounted on said shaft between the plates 12, 14, and a spring mounted between the plate 12 and end plate adjacent thereto, said spring having one end connected to the shaft 21, and its other end to the plate 12, substantially as and for the purpose described.

2. In a device of the character described, the combination with the substantially U-shaped casing closed at its front and provided with an oblong slot, and the end plates secured to said casing and provided with flanged ends for securing to a suitable support, of a shaft journaled in said end plates, a ratchet mounted on said shaft, a pivoted pawl for engagement with said ratchet, a spool mounted on said shaft, a pair of flanged plates 12, 14, mounted in the casing and secured to one of the end plates, a pinion 18 mounted on the shaft of the spool between the plates 12, 14, a toothed shaft journaled in said plates 12, 14, a pinion 19' mounted on said toothed shaft, a shaft 21 journaled in one of the end plates and in the plates 12, 14, a pinion 20 mounted on the shaft 21, and a spring arranged between the plate 12 and the end plate to which the plate 12 is connected with one end attached to the shaft 21 and its other end connected to the said plate 12, as and for the purpose specified.

In testimony whereof I affix my signature in the presence of two witnesses.

HARRY COOK.

Witnesses:
JOHN NOLAND,
A. M. WILSON.